(12) United States Patent
Englund et al.

(10) Patent No.: US 9,778,113 B2
(45) Date of Patent: Oct. 3, 2017

(54) ULTRACOMPACT FABRY-PEROT ARRAY FOR ULTRACOMPACT HYPERSPECTRAL IMAGING

(71) Applicant: The Trustees Of Columbia University In The City Of New York, New York, NY (US)

(72) Inventors: Dirk R. Englund, New York, NY (US); Chaitanya Rastogi, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 232 days.

(21) Appl. No.: 14/253,250

(22) Filed: Apr. 15, 2014

(65) Prior Publication Data
US 2014/0354999 A1 Dec. 4, 2014

Related U.S. Application Data

(63) Continuation of application No. PCT/US2012/061126, filed on Oct. 19, 2012.
(Continued)

(51) Int. Cl.
*G01J 3/45* (2006.01)
*G01J 3/26* (2006.01)
(Continued)

(52) U.S. Cl.
CPC ............... *G01J 3/45* (2013.01); *G01J 3/0259* (2013.01); *G01J 3/26* (2013.01); *G01J 3/2823* (2013.01);
(Continued)

(58) Field of Classification Search
CPC .... G01J 3/45; G01J 3/0259; G01J 3/26; G01J 3/2823; G01J 3/32; G01J 2003/2826; G01J 2003/452
(Continued)

(56) References Cited

U.S. PATENT DOCUMENTS

| 4,717,255 A | 1/1988 | Ulbers |
| 5,431,055 A | 7/1995 | Takata et al. |

(Continued)

FOREIGN PATENT DOCUMENTS

| EP | 1 432 048 | 6/2004 |
| WO | WO 2010/141114 | 12/2010 |

(Continued)

OTHER PUBLICATIONS

U.S. Appl. No. 14/731,874, filed Jun. 5, 2015.
(Continued)

*Primary Examiner* — Tarifur Chowdhury
*Assistant Examiner* — Jonathon Cook
(74) *Attorney, Agent, or Firm* — Baker Botts, LLP (57) ABSTRACT

Techniques for hyperspectral imaging, including a device for hyperspectral imaging including at least one tunable interferometer including a thin layer of material disposed between two or more broadband mirrors. Electrodes placed on either side of the tunable interferometer can be coupled to a voltage control circuit, and upon application of a voltage across the tunable interferometer, the distance between the mirrors can be modulated by physically altering the dimensions of the thin layer of material, which can uniformly load the broadband mirrors. Physically altering the dimensions of the thin layer of material can include one or more of deformation of a soft material, piezostrictrive actuation of a piezostrictrive material, or electrostrictive actuation of an electrostrictive material.

13 Claims, 8 Drawing Sheets

Related U.S. Application Data (60) Provisional application No. 61/549,073, filed on Oct. 19, 2011.

(51) Int. Cl.
*G01J 3/32* (2006.01)
*G01J 3/02* (2006.01)
*G01J 3/28* (2006.01)

(52) U.S. Cl.
CPC ......... *G01J 3/32* (2013.01); *G01J 2003/2826* (2013.01); *G01J 2003/452* (2013.01)

(58) Field of Classification Search
USPC ..................................................... 356/454
See application file for complete search history.

(56) References Cited

U.S. PATENT DOCUMENTS

| | | | |
|---|---|---|---|
| 5,455,421 A | 10/1995 | Spears | |
| 5,493,393 A | 2/1996 | Beranek et al. | |
| 5,565,987 A | 10/1996 | Jain et al. | |
| 5,760,939 A | 6/1998 | Nagarajan et al. | |
| 6,069,645 A | 5/2000 | Vincent | |
| 6,157,042 A | 12/2000 | Dodd | |
| 6,512,866 B1 | 1/2003 | Fan et al. | |
| 6,584,126 B2 | 6/2003 | Wang et al. | |
| 6,614,533 B1* | 9/2003 | Hata | G01J 3/2823 250/559.07 |
| 6,752,008 B1 | 6/2004 | Kley | |
| 7,091,500 B2 | 8/2006 | Schnitzer et al. | |
| 7,184,642 B2 | 2/2007 | Hoshi et al. | |
| 7,347,085 B2 | 3/2008 | Taber | |
| 7,356,225 B2 | 4/2008 | Loebel et al. | |
| 7,359,111 B1 | 4/2008 | Bratkovski | |
| 7,406,860 B2 | 8/2008 | Zhou et al. | |
| 7,474,811 B1 | 1/2009 | Quitoriano et al. | |
| 7,572,648 B2 | 8/2009 | Suzuki et al. | |
| 7,592,632 B2 | 9/2009 | Takagi | |
| 7,599,061 B1 | 10/2009 | Ting et al. | |
| 7,659,536 B2 | 2/2010 | Krishna et al. | |
| 7,817,274 B2 | 10/2010 | Zhang | |
| 8,053,782 B2 | 11/2011 | Avouris et al. | |
| 8,116,624 B1 | 2/2012 | Wach | |
| 8,189,302 B2 | 5/2012 | Gurney et al. | |
| 8,213,751 B1 | 7/2012 | Ho et al. | |
| 8,263,986 B2 | 9/2012 | Hajj-Hassan et al. | |
| 2001/0055147 A1 | 12/2001 | Little et al. | |
| 2002/0068018 A1 | 6/2002 | Pepper et al. | |
| 2003/0020926 A1 | 1/2003 | Miron | |
| 2004/0067163 A1 | 4/2004 | Prasad et al. | |
| 2004/0150873 A1 | 8/2004 | Pearsall | |
| 2004/0156610 A1 | 8/2004 | Charlton et al. | |
| 2004/0179803 A1 | 9/2004 | Bourelle | |
| 2005/0110992 A1 | 5/2005 | Scherer et al. | |
| 2005/0218328 A1 | 10/2005 | Suzuki et al. | |
| 2006/0058685 A1 | 3/2006 | Fomitchov et al. | |
| 2006/0092414 A1 | 5/2006 | Geshwind et al. | |
| 2006/0188721 A1 | 8/2006 | Irvin et al. | |
| 2006/0237639 A1 | 10/2006 | Kley | |
| 2006/0283338 A1 | 12/2006 | Degertekin | |
| 2007/0020144 A1 | 1/2007 | Du et al. | |
| 2007/0107501 A1 | 5/2007 | Taber | |
| 2008/0011065 A1 | 1/2008 | Su et al. | |
| 2008/0089367 A1 | 4/2008 | Srinivasan et al. | |
| 2008/0159679 A1 | 7/2008 | Sigalas et al. | |
| 2008/0186508 A1* | 8/2008 | Kiesel | G01J 3/26 356/519 |
| 2008/0223119 A1 | 9/2008 | Phan et al. | |
| 2009/0015757 A1 | 1/2009 | Potts et al. | |
| 2009/0237666 A1 | 9/2009 | Vollmer et al. | |
| 2009/0273779 A1 | 11/2009 | Baumberg et al. | |
| 2010/0014077 A1 | 1/2010 | Khetani et al. | |
| 2010/0027096 A1* | 2/2010 | Pan | G02B 26/001 359/260 |
| 2010/0117647 A1 | 5/2010 | Madore | |
| 2010/0142569 A1 | 6/2010 | Magel | |
| 2010/0176200 A1 | 7/2010 | Vollmer et al. | |
| 2010/0202035 A1 | 8/2010 | Noh et al. | |
| 2010/0275334 A1 | 10/2010 | Proksch et al. | |
| 2011/0042650 A1 | 2/2011 | Avouris et al. | |
| 2011/0149296 A1 | 6/2011 | Tearney et al. | |
| 2011/0151602 A1 | 6/2011 | Speier | |
| 2011/0158268 A1 | 6/2011 | Song | |
| 2011/0167525 A1 | 7/2011 | Humphris | |
| 2011/0175060 A1 | 7/2011 | Okai et al. | |
| 2011/0269259 A1 | 11/2011 | Tatani et al. | |
| 2011/0280263 A1 | 11/2011 | Kieu et al. | |
| 2011/0296929 A1 | 12/2011 | Tohmyoh et al. | |
| 2012/0039344 A1 | 2/2012 | Kian et al. | |
| 2012/0044489 A1 | 2/2012 | Chakravarty et al. | |
| 2012/0045169 A1 | 2/2012 | Hu et al. | |
| 2012/0069338 A1 | 3/2012 | Afzali et al. | |
| 2012/0126143 A1 | 5/2012 | Himmelhaus | |
| 2012/0206726 A1 | 8/2012 | Pervez et al. | |
| 2012/0219250 A1 | 8/2012 | Ren et al. | |
| 2012/0268745 A1 | 10/2012 | Kudenov et al. | |
| 2012/0298971 A1 | 11/2012 | Lee et al. | |
| 2014/0160336 A1 | 6/2014 | Englund et al. | |
| 2014/0196179 A1 | 7/2014 | Englund et al. | |
| 2014/0233028 A1 | 8/2014 | Englund et al. | |

FOREIGN PATENT DOCUMENTS

| | | |
|---|---|---|
| WO | WO 2011/046875 | 4/2011 |
| WO | WO 2011/089119 | 7/2011 |
| WO | WO 2012/115793 | 8/2012 |
| WO | WO 2012/128943 | 9/2012 |

OTHER PUBLICATIONS

U.S. Appl. No. 14/074,554, Jan. 22, 2015 Non-Final Office Action.
U.S. Appl. No. 14/074,554, Jun. 17, 2015 Response to Non-Final Office Action.
U.S. Appl. No. 14/074,554, Aug. 17, 2015 Notice of Allowance.
U.S. Appl. No. 14/150,380, May 26, 2015 Notice of Allowance.
U.S. Appl. No. 14/150,380, Aug. 20, 2015 Issue Fee Payment.
U.S. Appl. No. 14/150,389, Nov. 21, 2014 Non-Final Office Action.
U.S. Appl. No. 14/150,389, Jun. 10, 2015 Notice of Abandonment.
U.S. Appl. No. 14/501,735, filed Sep. 30, 2014.
International Search Report and Written Opinion for PCT/US13/073613, dated May 30, 2014.
International Search Report and Written Opinion for PCT/US13/032373, dated Jun. 13, 2013.
International Search Report and Written Opinion for PCT/US13/052020, dated Dec. 20, 2013.
International Search Report and Written Opinion for PCT/US13/031736, dated Oct. 29, 2013.
International Search Report and Written Opinion for PCT/US12/048837, dated Dec. 27, 2012.
International Search Report and Written Opinion for PCT/US12/048833, dated Apr. 5, 2013.
International Search Report and Written Opinion for PCT/US12/061126, dated Jan. 10, 2013.
Andryieuski et al., "Nanocouplers for infrared and visible light", *Advances in OptoElectronics*, Retrieved from the Internet: URL:http://arxiv.org/ftp/arxiv/papers/1206/1206.6601.pdf (32 pages) (2012).
Ban et al., "Near-infrared to visible light optical upconversion by direct tandem integration of organic light-emitting diode and inorganic photodetector", *Applied Physics Letters*, 90:093108 (2007).
Bao et al., "Graphene photonics, plasmonics, and broadband optoelectronic devices", *ACS Nano*, 6(5):3677-3694 (2012).
Bonaccorso et al., "Graphene photonics and optoelectronics", *Nature Photonics*, 4:611-622 (2010).
Boriskina et al., "Spectrally engineered photonic molecules as optical sensors with enhanced sensitivity: a proposal and numerical analysis", *JOSA B*, 23(8):1565-1573 (2006).

(56) References Cited

OTHER PUBLICATIONS

Bullis, "Graphene Transistors", *MIT Technology Review*, (Jan. 28, 2008); Retrieved from http://www.technologyreview.com/news/409449/graphene-transistors/ [downloaded on Oct. 23, 2014].

Butler et al., Nomenclature, symbols, units and their usage in spectrochemical analysis—IX. Instrumentation for the spectral dispersion and isolation of optical radiation (IUPAC Recommendations 1995), *Pure and Applied Chemistry*, 67(10):1725-1744 (1995).

Craven-Jones et al., "Infrared hyperspectral imaging polarimeter using birefringent prisms", *Appl. Opt.*, 50(8):1170-1185 (2011).

DeCorby et al., "Chip-scale spectrometry based on tapered hollow Bragg waveguides", *Optics Express*, 17(19):16632-16645 (2009).

Fang et al., "Graphene-antenna sandwich photodetector", *Nano Letters*, 12(7):3808-3813 (2012).

Furchi et al., "Microactivity-integrated grapheme photodetector", *Nano Letters*, 12(6):2773-2777 (2012).

Gan et al., "A high-resolution spectrometer based on a compact planar two dimensional photonic crystal cavity array", *Applied Physics Letters*, 100:231104 (4 pages) (2012).

Geim et al., "The rise of grapheme", *Nature Materials*, 6(3):183-191 (2007).

Huang et al., "Study of residual background carriers in midinfrared In As/Ga Sb superlattices for uncooled detector operation", *Applied Physics Letters*, 92:071102 (2008).

Ismail et al., "Raman spectroscopy with an integrated arrayed-waveguide grating", *Optic Letters*, 36(23):4629-4631 (2011).

Jelezko et al., "Read-out of single spins by optical spectroscopy", *Journal of Physics: Condensed Matter*, 16:R1089-R1104 (2004).

Kim et al., "Graphene-based plasmonic waveguides for photonic integrated circuits", *Optics Express*, 19(24):24557-24562 (2011).

Kuzmenko et al., "Universal optical conductance of graphite", *Phys. Rev. Lett.*, 100(11):117401 (2008).

Lidstone et al., "Label-free imaging of cell attachment with photonic crystal enhanced microscopy", *Analyst*, 136(18):3608-3615 (2011).

Liu et al., "A graphene-based broadband optical modulator", *Nature*, 474(7349):64-67 (2011).

Lu et al., "Nanoscale graphene electro-optic modulators based on graphene-slot waveguides", *JOSA B*, 29(6):1490-1496 (2012).

Makhlouf et al., "Multispectral confocal microendoscope for in vivo and in situ imaging", *Journal of Biomedical Optics*, 13(4):044016 (2008).

Pisani et al., "Compact imaging spectrometer combining fourier transform spectroscopy with a Fabry-Perot interferometer", *Optics Express*, 17(10):8319-8331 (2009).

Sarkissian et al., "Spectroscopy of a tapered-fiber photonic crystal waveguide coupler", *Optics Express*, 17(13):10738-10747 (2009).

Sheilds et al., "A scanning cavity nanoscope", *41st Annual Meeting of the APS Division of Atomic Molecular and Optical Physics*, 55(5), Tuesday-Saturday, May 25-29, 2010, Houston, Texas.

Tsuji et al., "An efficient and compact difference-frequency-generation spectrometer and its application to $^{12}CH_3D/^{12}CH_4$ isotope ratio measurements", *Sensors (Basel)*, 10(7):6612-6622 (2010).

Wang et al., "Graphene on SiC as a Q-switcher for a 2 μm laser", *Optics Letters*, 37(3):395-397 (2012).

Xia et al., "Ultrafast graphene photodetector", *Nature Nanotechnology*, 4(12):839-843 (2009).

\* cited by examiner

Fig. 2a — Patterned Soft Material

Fig. 2b — Patterned Mirror Posts

ULTRACOMPACT FABRY-PEROT ARRAY FOR ULTRACOMPACT HYPERSPECTRAL IMAGING

CROSS-REFERENCE TO RELATED APPLICATIONS

This application is a continuation of International Patent Application No. PCT/US12/061126, filed Oct. 19, 2012, which claims the benefit of U.S. Provisional Application Ser. No. 61/549,073, filed Oct. 19, 2011, each of which is incorporated herein by reference in its entirety and from which priority is claimed.

STATEMENT OF FEDERALLY SPONSORED RESEARCH OR DEVELOPMENT

This invention was made with government support under Grant No. PECASE FA9550-12-1-0045, awarded by the Air Force Office of Scientific Research. The government has certain rights in the invention.

BACKGROUND

The disclosed subject matter relates to techniques for hyperspectral imaging.

Different materials absorb and emit electromagnetic radiation in corresponding different manners, and this spectrum can serve as a fingerprint for a particular material, helping to identify it from others. The ability to visualize multiple frequencies of the spectrum can permit the material composition of the imaged region to be deduced. Unfortunately, certain conventional imaging technologies can provide limited spectral information, focusing on a few frequency ranges.

A hyperspectral imager can allow the visualization of many frequencies and, with adequate post-processing, can provide detailed information about the material composition of the environment or sample. As a result, hyperspectral imagers can be used to identify weapons, biological agents and chemicals, among other things.

In general, certain approaches to hyperspectral imaging can include using a one-dimensional spectrometer resolved into a 2D plane. That is, for example, one dimension can be a spatial dimension and the other dimension can be a spectral dimension. However, in certain instances it can be useful to simultaneously resolve spatial information and spectral information in at least two dimensions, for example where comparison of spectral signatures at discrete spatial locations is desired. In certain other techniques, a tunable optical filter can be used in connection with an imaging array. For example, the tunable optical filter can be tuned over various bands in a spectrum, and at each band an image can be acquired at each pixel in the array, thereby providing a spectral range.

Certain approaches to hyperspectral imaging can be complex, bulky, expensive, and can include various limitations. For example, certain hyperspectral imaging technology can rely on large, expensive optical assemblies such as diffraction gratings or prisms; similarly, optical modulation techniques such as acousto-optic tunable filters or liquid crystal tunable filters can be used. Certain other approaches can involve the use of imaging integrated circuits with patterned color filters on the surface, integrated pixel-arrays, photonic crystal arrays, tunable band gap semiconductor detectors, and MEMS-based tunable cavity arrays.

Certain approaches, such as the use of patterned color filters arrays, integrated pixels arrays, and photonic crystal arrays, can have fixed spectrum depth due to the fact that the filters are not tunable. Other approaches, such as e.g., the use of photonic crystals, MEMS, or tunable band gap semiconductor technologies can be ill-suited for general-purpose sensing or imaging applications, have low detection efficiency, and can be difficult to integrate with existing imaging optics. Still other approaches, e.g., MEMS-based approaches, can suffer from performance deterioration over time owing to mechanical wear and electrostatic attraction between individual components.

Certain approaches to hyperspectral imaging, can include the use of Fabry-Perot interferometers to obtain spectral ranges for pixels of an imaging array. In this manner, spatial information (e.g., via a plurality of pixels) can be obtained, as well as spectral information. For example, stacks of $Si/SiN_x$ can be used as broadband mirrors, disposed around an air cavity, and can create a resonant cavity. Electrodes can be placed on the outer side of the mirrors, and a voltage can be applied to create a capacitance between the mirrors, and thereby modulate the distance between the mirrors via capacitive forces. Example techniques are disclosed in U.S. Pat. Nos. 7,355,714, 7,385,704, and 6,295,130, each of which is hereby incorporated by reference in its entirety.

However, controlling the distance between the mirrors using voltage applied to the electrodes can be difficult. For example, due to the quadratic dependence of displacement on applied voltage of the spring-capacitor system, precise control of a system's displacement can be difficult due to an inherent nonlinearity. Special control circuitry can be required to attain finer control.

SUMMARY

The disclosed subject matter provides devices for hyperspectral imaging. In an exemplary arrangement, the device can include at least one tunable interferometer including a thin layer of strictive material disposed between two or more broadband mirrors. The broadband mirrors can be reflective over a first wavelength range. First and second electrodes can be disposed on each side of the at least one tunable interferometer and each can be transparent over at least the first wavelength range. A voltage control circuit can be electrically coupled to the first and second electrodes, whereby application of a voltage over the tunable interferometer modulates the distance between the broadband mirrors via strictive displacement of the thin layer of strictive material. The voltage control circuit can be adapted to control the strictive displacement.

In one embodiment, the thin layer of strictive material can include a piezostrictive polymer, such as poly(vinylidene-fluoride-co-trifluoroethylene). The strictive material can include a piezostrictive ceramic, such as barium nitrite, with an air gap patterned therein between at least a portion of the broadband mirrors. The strictive material can include an electrostrictive material. In certain embodiments, the tunable interferometer can include a plurality of mirrors, each with a thin layer of strictive material disposed therebetween. The plurality of mirrors can form a set of coupled vertical resonators. The voltage control circuit can include a high-resolution digital-to-analog converter, which can modulate the distance between the mirrors via strictive displacement. The device can also include an array of pixels. A plurality of tunable interferometers can be arranged in a grid corresponding to the array of pixels, such that each tunable interferometer is coupled to one of the pixels in the imaging array.

In another embodiment, a device for hyperspectral imaging can include at least one tunable interferometer including a thin layer of soft material disposed between two or more broadband mirrors. The broadband mirrors can be reflective over a first wavelength range, and each mirror can include at least one dielectric material. One or more interstitial trenches can be formed within the interferometer into which the thin layer of soft material can expand, thereby allowing pressure to be distributed. First and second electrodes can be disposed on each side of the at least one tunable interferometer and each transparent over at least the first wavelength range. A voltage control circuit can be electrically coupled to the first and second electrodes. Application of a voltage over the tunable interferometer can modulate the distance between the broadband mirrors corresponding to a capacitance, and the voltage control circuit can be adapted to control the capacitance.

In one embodiment, the cavity can be filled with a thin layer of soft material, such as polydimethylsiloxane. The thin layer of polydimethylsiloxane can include one or more interstitial trenches, thus allowing pressure to be distributed upon application of the voltage. The broadband mirrors can include one or more interstitial trenches. In certain embodiments, the tunable interferometer can include a plurality of mirrors, each with a cavity disposed therebetween. The plurality of mirrors can form a set of coupled vertical resonators. The voltage control circuit can include a high-resolution digital-to-analog converter, which can modulate the distance between the mirrors energy minimization between the spring-capacitor system formed from the voltage over the dielectric material in the mirrors and the thin layer of soft material. The device can also include an array of pixels. A plurality of tunable interferometers can be arranged in a grid corresponding to the array of pixels, such that each tunable interferometer is coupled to one of the pixels in the imaging array.

The disclosed subject matter also provides methods for hyperspectral imaging using a tunable interferometer. In an exemplary arrangement, a method can include modulating a distance between broadband mirrors with an applied voltage differential between electrodes. Modulation of the distance between the mirrors can alter the resonance of the tunable interferometer.

In one embodiment, modulating the distance between the broadband mirrors can include beating between multiple resonances to thereby realize a single transmission peak. Additionally or alternatively, modulating the distance between the broadband mirrors can include dynamically switching between low-spectral resolution modes of a first interferometer to cover a plurality of high-spectral resolution modes of a second interferometer. In certain embodiments, modulating the distance between the broadband mirrors further includes independently modulating the distance for each tunable interferometer and thus independently scanning through multiple frequencies at different locations in of a field of view It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

Throughout the drawings, the same reference numerals and characters, unless otherwise stated, are used to denote like features, elements, components or portions of the illustrated embodiments. Moreover, while the disclosed subject matter will now be described in detail with reference to the Figs., it is done so in connection with the illustrative embodiments.

DETAILED DESCRIPTION

The disclosed subject matter provides techniques for hyperspectral imaging, including a device for hyperspectral imaging including at least one tunable interferometer including a thin layer of material disposed between two or more broadband mirrors. Electrodes placed on either side of the tunable interferometer can be coupled to a voltage control circuit, and upon application of a voltage across the tunable interferometer, the distance between the mirrors can be modulated by physically altering the dimensions of the thin layer of material, which can uniformly load the broadband mirrors. As disclosed herein, physically altering the dimensions of the thin layer of material can include uniform alteration of the dimensions of the thin layer of material via one or more of deformation of a soft material, piezostrictrive actuation of a piezostrictrive material, or electrostrictive actuation of an electrostrictive material.

The disclosed subject matter provides a device for hyperspectral imaging including a thin layer of strictive material disposed between two or more broadband mirrors. As used herein, the term "strictive" material can include piezostrictrive material and/or electrostrictive material. The use of a strictive material can provide robust control over the displacement of the mirrors, as piezostrictive displacement, for example, can vary linearly with applied voltage, thus providing easier calibration and control of the system. In connection with a high resolution digital-to-analog converter, a voltage control circuit can provide for improved control over the displacement of the mirrors, and thus improved control over the resonance of the interferometer. Moreover, the use of piezostrictrive materials can provide for bidirectional movement—i.e., changing the polarity of the electrodes can cause the material to expand (or contract). The strictive material can uniformly deform and displace at least one of the mirrors, e.g., through an applied force due to the uniform deformation, without uneven mechanical strain or wear owing to the solid-state nature of the material.

The disclosed subject matter also provides for a device for hyperspectral imaging including at least one tunable interferometer including a thin layer of soft material disposed between two or more broadband mirrors. The broadband mirrors can be reflective over a first wavelength range. Each broadband mirror can include, e.g., at least one dielectric material. A voltage control circuit can apply a voltage drop over mirrors via electrodes disposed on either side thereof to modulate the distance between the mirrors.

Figure 1:
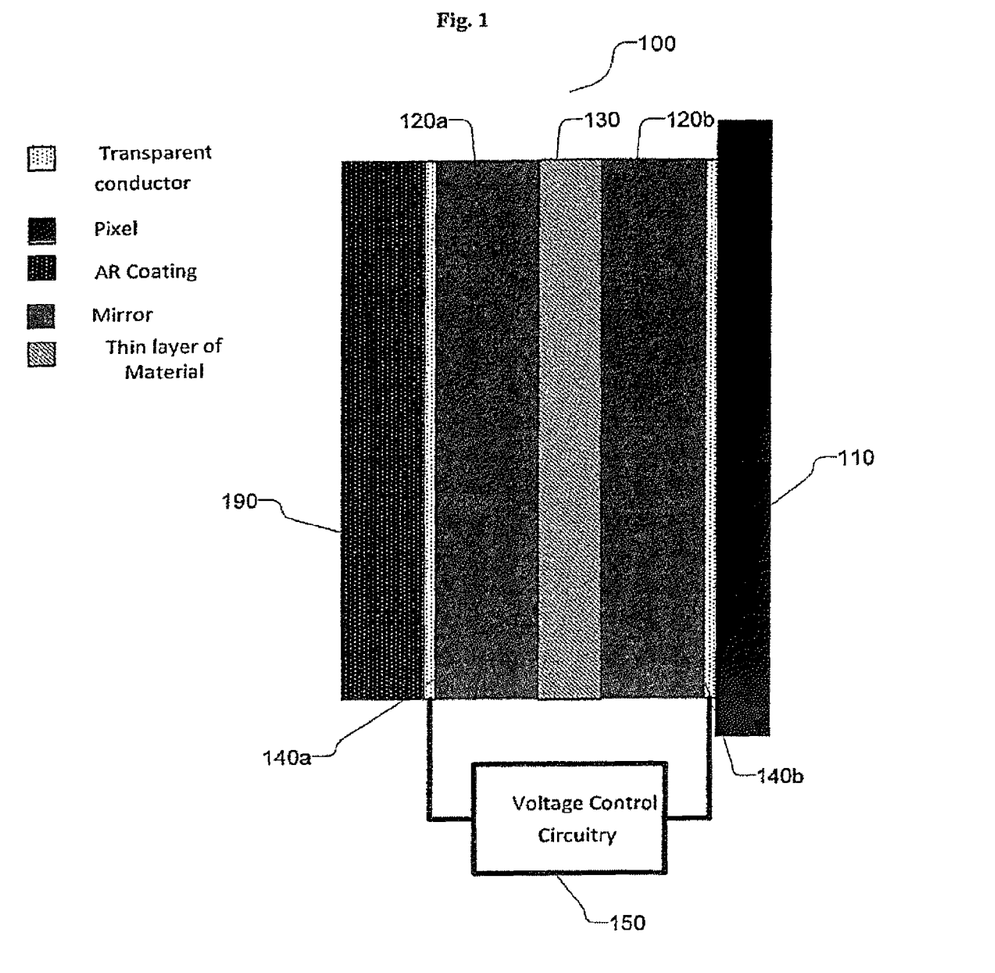
FIG. 1 is a schematic diagram of a device for hyperspectral imaging in accordance with an embodiment of the disclosed subject matter.

The accompanying figures, where like reference numerals refer to identical or functionally similar elements throughout the separate views, serve to further illustrate various embodiments and to explain various principles and advantages all in accordance with the disclosed subject matter. For purposes of illustration and not limitation, description will now be made of an exemplary tunable interferometer in accordance with an embodiment of the disclosed subject matter. With reference to FIG. 1, an exemplary tunable interferometer can be a tunable Fabry-Perot interferometer 100. The interferometer 100 can include two broadband mirrors 120a and 120b (collectively 120) disposed around a thin layer of material 130. Electrodes 140a and 140b (collectively 140) can be disposed on each side of the broadband mirrors 120 and electrically coupled to a voltage control circuit 150. In certain embodiments, an anti-reflective (AR) coating 190 can be applied to enhance coupling efficiency.

For purposes of illustration and not limitation, the interferometer 100 can exhibit transmission peaks at the resonance of the cavity. These resonances can exist at integer multiples of the optical path length at normal incidence, which can be given by $$v_{res} = n\frac{c}{2d}, \quad (1)$$

where n is an integer and d is the distance between the two mirrors 120. The separation between adjacent transmission peaks (i.e., the free spectral range [FSR]) of the cavity can be given by:

$$FSR = \Delta v = \frac{c}{2d}. \quad (2)$$

The FSR indicates that for smaller cavity lengths, fewer modes can exist within the cavity, and the spectral spacing between adjacent modes can be large. While adjacent modes in the cavity can have a large separation, the ability of the resonator to reject neighboring wavelengths can depend on the reflectivity of the mirrors and can be governed by the cavity quality factor, Q. Cavities with low Q can display wide transmission peaks centered around the resonance frequency, while those with high Q factors can allow the transmission only of the resonance frequency. Thus, the transmission linewidth $v_{FWHM}$ can depend on both the cavity length as well as the Q factor, and can be given by:

$$v_{FWHM} = \frac{v}{Q}. \quad (3)$$

For wavelengths in the visible spectrum, a Q factor of roughly 1000 can be required for sub-nm spectral resolution.

Figure 7A:
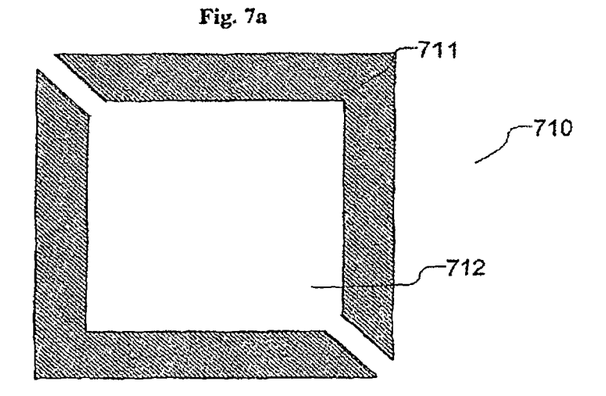
FIGS. 7a, 7b and 7c illustrate a top view of exemplary geometries and patterns for interferometers in accordance with embodiments of the disclosed subject matter.
Figure 7B:
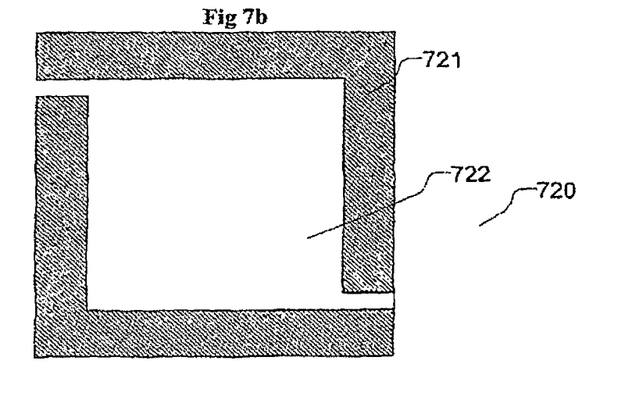
Figure 7C:
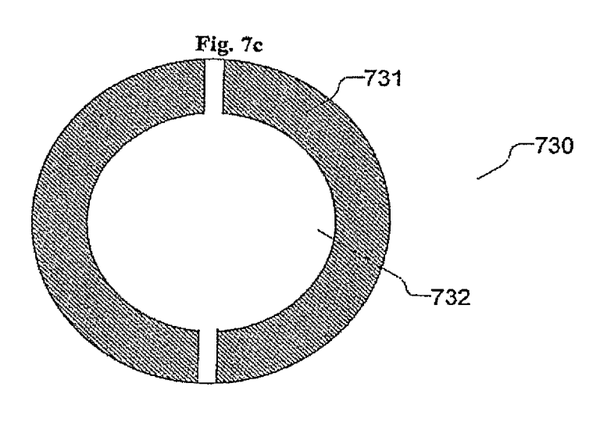

In an exemplary embodiment, the thin layer of material 130 can be a piezostrictive material. The piezostrictive material can be, for example, a piezostrictive polymer, such as poly(vinylidenefluoride-co-trifluoroethylene) (P(VDF-TRFE)). Piezostrictive materials that are transparent over a wavelength range to be imaged, such as P(VDF-TRFE) can fill substantially all of the space between the broadband mirrors 120. Additionally or alternatively, the piezostrictive material can be a piezostrictive ceramic, such as barium nitrite, e.g., deposited onto one of the mirrors via sputtering. Piezostrictive materials that are not transparent over a wavelength range to be imaged, such as certain piezostrictrive ceramics, can be further patterned to define an air hole, or cavity filled with another transparent material, therein. In such embodiments, the electrodes 140 can be likewise patterned, such that the profile of the electrodes match the profile of the patterned piezostrictrive ceramic. For example, a circular or rectangular hole can be patterned in a piezostrictrive ceramic material deposited on one of the broadband mirrors and/or the electrodes. FIGS. 7a, 7b, and 7c illustrate non-limiting exemplary shape configurations for the electrodes and/or non-transparent piezostrictrive material.

The broadband mirrors 120 can be highly reflective over a specified wavelength range. The electrodes 140 can be transparent at least over a particular wavelength range. The arrangement of the electrodes 140 on either side of the mirrors 120 and thin layer of material 130 can create a solid-state piezo actuator. That is, for example, application of a voltage with voltage control circuit 150 can create a voltage drop across the electrodes and thus modulate the distance between mirrors 120 via piezostrictive displacement of the piezostrictive material. Voltage control circuit 150 can include a high-resolution digital-to-analog converter which can allow for high-resolution control over the thickness of the distance between the mirrors 120.

As disclosed herein, the displacement of the piezostrictive material can linearly scale with the voltage applied to the electrodes. Moreover, the use of a piezostrictrive material can provide bidirectional movement. That is, for example, changing the polarity of the electrodes can cause the material to expand or contract, depending on the direction of the voltage drop, such that a "neutral" displacement can correlate to zero applied voltage. For purposes of example, and not limitation, piezoelectricity can be given by $\in=Ed$, where $\in$ is the induced strain, E is the applied electric field, and d is the piezoelectric strain constant. For an applied voltage V, the electric field can be given by E=V/L, where L is the length between the two broadband mirrors 120. Accordingly, the piezoelectric strain can be given by $\in=Vd/L$ and thus the change in position x can be given by $\Delta x=Vd$.

As embodied herein, use of a piezostrictrive material can further provide highly uniform alteration of the physical dimensions of the material, due to its unique material properties. Due to the uniform alternation of the dimensions of the material, the mirrors can be displaced relative one another without deformation (e.g., curvature or bowing of the mirror) as can occur in connection with, e.g., mechanical deflection of the mirrors with an air gap defined therebetween. Curvature of the mirrors can create an unstable cavity and can degrade the resonant qualities of the interferometer. Furthermore, use of a piezostrictive material between the broadband mirrors can prevent electrostatic attraction such as static friction ("stiction") between the broadband mirrors. That is, for example, the mirrors can be prevent from sticking together, as can occur with, e.g., mechanical deflection of the mirrors with an air gap defined therebetween.

In another exemplary embodiment, the thin layer of material 130 can be an electrostrictive material. The electrostrictive material can include, for example, polydimethylsiloxane (PDMS), lead magnesium niobate (PMN), lead magnesium niobate-lead titanate (PMN-PT), or lead lanthanum zirconate titanate (PLZT). In like manner to the exemplary embodiment disclosed herein in connection with the use of piezostrictrive materials, the broadband mirrors 120 can be highly reflective over a specified wavelength range. The electrodes 140 can be transparent at least over a particular wavelength range. The arrangement of the electrodes 140 on either side of the mirrors 120 and thin layer of material 130 can create a solid-state electrostrictive actuator. That is, for example, application of a voltage with voltage control circuit 150 can create a voltage drop across the electrodes and thus modulate the distance between mirrors 120 via electrostrictive displacement of the electrostrictive material. Voltage control circuit 150 can include a high-resolution digital-to-analog converter which can allow for high-resolution control over the thickness of the distance between the mirrors 120.

As disclosed herein, the displacement of the electrostrictive material can scale with the voltage applied to the electrodes in a quadratic manner. For purposes of illustration and not limitation, the electrostrictive strain can be given by $\in = ME^2$, where E is the applied electric field and M is the electrostrictive coefficient. Thus, the electrostrictive strain can be dependent on the square of applied voltage. As embodied herein, use of a electrostrictive material can further provide highly uniform alteration of the physical dimensions of the material, due to its solid state nature. Due to the uniform alternation of the dimensions of the material, the mirrors can be displaced relative one another without deformation (e.g., curvature or bowing of the mirror) as can occur in connection with, e.g., mechanical deflection of the mirrors with an air gap defined therebetween. Curvature of the mirrors can create an unstable cavity and can degrade the resonant qualities of the interferometer. As with the use of a piezostrictive material described above, use of an electrostrictive material between the broadband mirrors can also prevent stiction between the broadband mirrors. That is, for example, the mirrors can be prevented from sticking together, as can occur with, e.g., mechanical deflection of the mirrors with an air gap in between.

In another exemplary embodiment, the thin layer of material 130 can be a soft material, such as for example polydimethylsiloxane (PDMS) or other suitable elastic material. The layer of soft material can be transparent over a wavelength range to be imaged and can fill substantially all of the space between the broadband mirrors 120, which can provide for uniformity of displacement of the mirrors 120. For purposes of illustration, and not limitation, in contrast to an air gap, filling substantially all of the space between the broadband mirrors 120 can enhance the uniformity of movement as the mirror membranes are prevented from bowing inwards. Curving or bowing can create non-plane waves, which can expand and change v=phase and curvature as it propagates. As such, significant losses within the interferometer can occur because of divergence and the loss of constructive interference within the cavity. Furthermore, use of a soft material between the broadband mirrors can also prevent stiction between the broadband mirrors. That is, for example, the mirrors can be prevented from sticking together, as can occur with, e.g., mechanical deflection of the mirrors with an air gap in between.

In like manner to the exemplary embodiments described herein in connection with the use of piezostrictrive or electrostrictive materials, the broadband mirrors 120 can be highly reflective over a specified wavelength range. The electrodes 140 can be transparent at least over a particular wavelength range. The arrangement of the electrodes 140 on either side of the mirrors 120 and soft layer of material 130 can create a solid-state capacitor-spring system. That is, for example, application of a voltage with voltage control circuit 150 can create a voltage drop across the electrodes and thus modulate the distance between mirrors 120 via energy minimization between the spring-capacitor system. Voltage control circuit 150 can include a high-resolution digital-to-analog converter which can allow for high-resolution control over the thickness of the distance between the mirrors 120. Alternatively, in connection with the use of a thin layer of soft material and capacitive forces or an electrostrictive material and electrostrictive displacement, a charge control circuit can be used rather than a voltage control circuit, as displacement in connection with these materials can scale linearly with stored charge.

As embodied herein, devices for hyperspectral imaging in accordance with the disclosed subject can include a thin layer of material (e.g., a soft layer of material, a piezostrictive material, and/or an electrostrictive material) disposed between two or more broadband mirrors. The soft layer of material, in contrast to certain MEMS devices using mechanical deflection of the mirrors surrounding an air gap or other fluid gap, can provide uniform displacement of the mirrors, without bowing or curving, and can prevent the mirrors from sticking together via electrostatic attraction. Accordingly, the techniques disclosed herein can provide robust and reliable actuation techniques for displacement of the mirrors of an interferometer used in connection with hyperspectral imaging.

For purpose of illustration and not limitation, the sensitivity of the interferometer 100 to an applied voltage across electrodes 140 will now be described. As noted above, a capacitor-spring system is created using two broadband mirrors surrounding a soft layer of material. A potential difference of V can be created over a distance between the mirrors of $x_0 + \Delta x$, with an intrinsic spring constant k and an electrode area A. The resting gap distance of the spring-capacitor system can be $x_0$ and can be increased by $\Delta x$. The energy of the spring-capacitor system can thus be given by:

$$U_{int} = \frac{1}{2}k\Delta x^2 - \frac{1}{2}\frac{\varepsilon_0 A}{x_0 + \Delta x}V^2 \qquad (4)$$

In equilibrium, force is zero. Assuming $x_0 \gg \Delta x$ and solving for $\Delta x$ as a function of V can provide:

$$F = -\frac{\partial U}{\partial x} = \qquad (5)$$

$$-k\Delta x + \frac{1}{2}\frac{\varepsilon_0 A}{(x_0 + \Delta x)^2}V^2 = 0 \rightarrow -2k\Delta x(\Delta x^2 + 2\Delta x x_0 + x_0^2) = \varepsilon_0 A V^2$$

which can be approximated by dropping high-order terms in x, as given as:

$$-2k\Delta x x_0^2 = C_0 V^2 \rightarrow \Delta x = -\frac{C_0}{2kx_0^2} V^2, \quad (6)$$

where $C_0$ is the unperturbed capacitance of the system given by $\in_0 A$. Thus, the displacement can depend quadratically on voltage.

In connection with this exemplary embodiment, and in general in connection with the use of a capacitor-spring system as an actuation technique to modulate the distance between the broadband mirrors 120 surrounding a soft thin layer of material 130, as disclosed herein, each Fabry-Perot interferometer 100 can be approximately 10 μm×10 μm to correspond with pixels of approximately the same size of a CCD array. However, one of ordinary skill in the art will appreciate that such dimensions are not limiting, and any suitable size can be used. Additionally, for purposes of illustration and not limitation, in an exemplary embodiment, the range of thicknesses between the broadband mirrors can correspond to the visible spectrum partitioned into the red (690-630 nm), green (630-570 nm), and blue (570-510 nm) spectrums. Assuming, for purposes of illustration and not limitation, a FSR of 60 nm and a thin layer of material comprised of PDMS, the thickness between the mirrors corresponding to the red spectrum can be approximately 2.36 microns, the thickness corresponding to the green spectrum can be 1.93 microns, and the thickness corresponding to the blue spectrum can be 1.54 microns. One of ordinary skill in the art will appreciate that the distances can be tailored to any spectral range, which can further be binned into finer frequency bands with appropriate corresponding distances.

Again in connection with an exemplary and non-limiting embodiment, the voltage control circuit 150 can be configured to apply a maximum voltage corresponding to the breakdown voltage of the thin layer of material. For example, in connection with PDMS, the breakdown voltage can be on the order of 2×10⁷ V/m. Accordingly, the maximum voltage can be approximately 100 V for a thickness between the mirrors of approximately 6.8 μm at rest. The maximum voltage applied to the electrodes 140, can, for example, enable a maximum capacitance depending on the dimensions of the cavity, the dimensions of the mirrors, and the dielectric constant of the mirrors. Thus, by applying a voltage between 0 and the maximum voltage, the distance between the mirrors can be controlled depending on, inter alia, the effective spring constant, k, (which can be determined with reference to the young's modulus and the area over which the force is applied) of the thin layer of material 130. In certain embodiments, the range of distances between the mirrors can correspond to a desired range in FSR. For example, with reference to equation 1 above, the FSR can be selected by applying a suitable voltage to modulate the distance between the mirrors to a desired displacement.

As disclosed herein, the broadband mirrors 120 can be formed from a variety of materials. The broadband mirrors 120 can be, for example, formed from stacks of dielectric materials to form a distributed Bragg reflector, which each layer having a thickness of approximately a quarter of the average transmission wavelength through the material. Additionally, for example, each layer can have surface roughness below a tenth of the average wavelengths in a vacuum. Alternatively, the broadband mirrors 120 include, e.g., silver or half-silvered or other reflective materials.

For purposes of illustration and not limitation, where the thin layer of material includes a soft material, the broadband mirrors 120 can be formed from stacks of a suitable dielectric such as stacks of tantalum pentoxide and silicon dioxide ($Ta_2O_5/SiO_2$), titanium dioxide and silicon dioxide ($TiO_2/SiO_2$), or other known stacks used in connection with distributed Bragg reflectors. Such dielectrics can be formed, e.g., using chemical vapor deposition (CVD) techniques, or can be deposited using sputtering/e-beam techniques, among others. The electrodes 140 disposed on either side of the interferometer can be transparent at least over a particular wavelength range. In this manner, the arrangement of the electrodes 140 on either side of the mirrors 120 and thin layer of material 130 can create a solid-state capacitor-spring system. That is, application of a voltage with voltage control circuit 150 can create a voltage drop across the electrodes and thus modulate the distance between mirrors 120 via capacitive forces. For example, displacement can be controlled via energy minimization between the spring-capacitor system, as described above. Voltage control circuit 150 can include a high-resolution digital-to-analog converter which can allow for high-resolution control over the thickness of the distance between the mirrors 120. In connection with, for example, $Ta_2O_5/SiO_2$ or $TiO_2/SiO_2$ stacks, which have properties of a high-k dielectric, high-resolution control over the thickness can be enhanced.

In connection with certain embodiments involving the use of a thin layer of soft material disposed between the mirrors, when the dimensions of the thin layer of material 130 are altered due to compressive forces induced by the capacitor-spring system, it can expand/contract in other directions to conserve volume. In certain exemplary embodiments, and with reference to FIG. 2, certain patterning techniques can be used to facilitate expansion of the thin layer of material 130 into such other directions. For example, with reference to FIG. 2a, interstitial trenches 231a, 231b, and 231c (collectively 231) can be formed by patterning the thin layer of material 230. Alternatively, with reference to FIG. 2b, interstitial trenches can be formed in one or both of the broadband mirrors 120. For example, interstitial trenches 221a, 221b, and 221c (collectively 221) can be formed in mirror 220a. Each trench 231 or 221 can correspond to the boundary between one or more pixels 110. For example, interstitial trench 231a in thin layer of material 230 can be disposed between pixel 110a and pixel 110b. Likewise, interstitial trench 221a can be disposed between pixel 110a and pixel 110b.

Figure 2A:
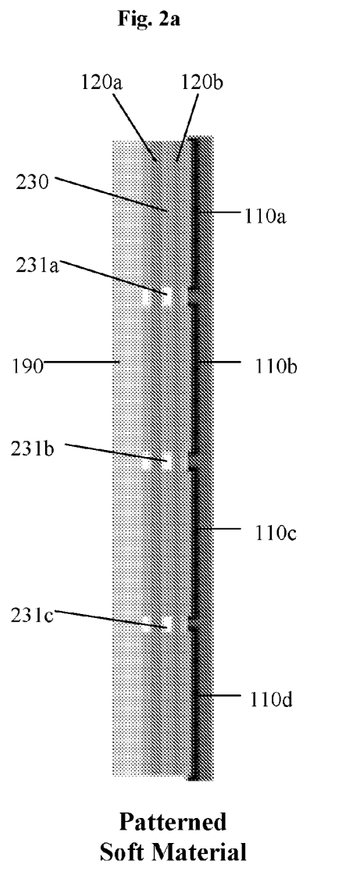
FIG. 2a is a schematic diagram of a tunable interferometer for hyperspectral imaging including a patterned material disposed between two mirrors in accordance with an embodiment of the disclosed subject matter.
Figure 2B:
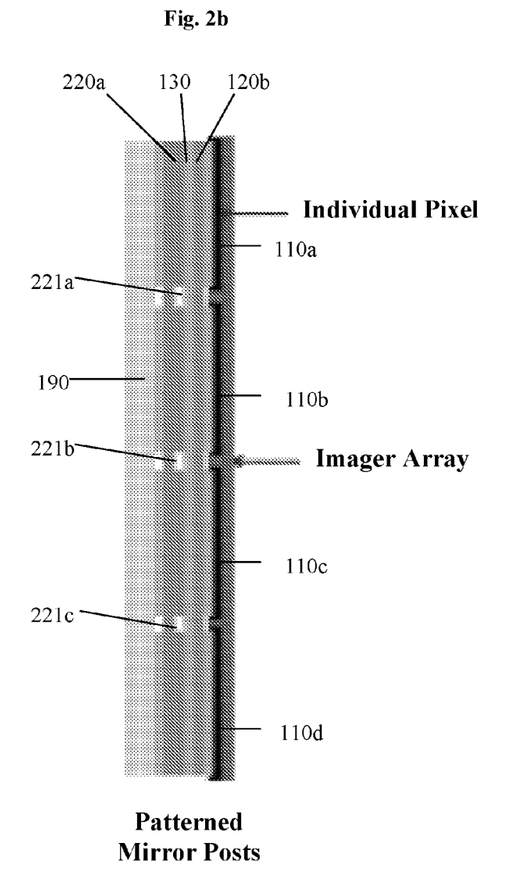
FIG. 2b is a schematic diagram of a tunable interferometer for hyperspectral imaging including a patterned mirror in accordance with an embodiment of the disclosed subject matter.

In this manner, when the physical dimensions of the thin layer of material 130 or 230 are altered via deformation under application of a voltage from the voltage control circuit 150, the thin layer of material 130 or 230 disposed between the mirrors 120 and/or 220 can be compressed into the interstitial trenches 221 and 231, thereby facilitating modulation of the distance between the mirrors and enhancing the uniformity of expansion or compression for each mirror. As a result, the range of FSR enabled by modulation of the distance between the mirrors 120, as discussed above, can be increased.

In other embodiments, the thin layer of soft material 130 or 320 (including a soft layer of piezostrictive or electrostrictive material) or one of the mirrors 220a can be patterned with shapes other than interstitial trenches. One of ordinary skill in the art will appreciate that the disclosed subject matter is not limited to any particular pattern. For purposes of example, and not limitation, and with reference to FIGS. 7a, 7b, and 7c, which illustrate the top view of a pixel of exemplary interferometers, such shapes can include cutouts of the material from the edges 711 corresponding to a square interferometer 710 with diagonal strips of material covering two of the corners. Alternatively, the material can be patterned such that edges 721 of a square interferometer 720 are exposed, with strips of materials extending to the edge adjacent and to two corners. Alternatively, the interferometer can be circular 730, and the edge 731 can be exposed and the soft material 732 can likewise be circularly patterned, and can extend to the edges of the interferometer at opposite points.

For purposes of illustration and not limitation, description will now be made of the physical deformation of a thin layer PDMS to illustrate the utility of patterning interstitial trenches or other shapes in the soft later of material. The force required to squeeze the PDMS between the mirrors by some strain s can scale with the area. From a generalization of Hooke's law for isotropic materials, the strain in a the dimension orthogonal to the mirrors can be given by $$\varepsilon_z = \frac{1}{E}\sigma_z \rightarrow F_z = \sigma_z A = \varepsilon_z E A, \quad (7)$$

and tangential strain (i.e., the x and y dimensions if z is the dimension orthogonal to the mirrors) can be given by $$\epsilon_{x,y} = 1-(1+\epsilon_z)^{-\nu}, \quad (8)$$

where $\nu$ is Poisson's ratio. The amount of force required to compress an isotropic material with strain $\epsilon_z$, and the magnitude of expansion in the tangential directions resulting therefrom, can then be determined. The interferometer can be tuned by a predetermined spectral range, or a strain in the cavity length, as given by:

$$\frac{2nl}{m} - \frac{2n(l+\Delta)}{m} = \frac{\lambda^2}{2nl+\lambda} \rightarrow \frac{1\lambda}{2nl \pm \lambda} \rightarrow \varepsilon_{z,\pm} = \frac{\lambda}{2nl \pm \lambda}, \quad (9)$$

where m is the order of the mode. For purposes of example and not limitation, for a 3.6 micron cavity at 635 nm, the vertical strain can be approximately 6.7% and the tangential strain can be approximately 3.2%. For an optical cavity over the thin layer of material of increasing thickness, the vertical strain can decrease, but at the cost of lower spectral resolution, and vice versa.

In an exemplary embodiment, in connection with the use of a piezostrictrive material, the strain can be reduced by shifting the FSR by half in either direction. The bi-directional nature of piezostrictrive materials, which scales linearly with applied voltage, can thus provide reduced strain. Alternatively, in connection with a electrostrictive material, such as PDms, small feature sizes for the thin layer of material can be used to reduce the force requirements, thus mitigating the vertical strain. As disclosed herein, the lateral strain can be mitigated by providing trenches or other shapes on the order of the feature size.

Figure 5:
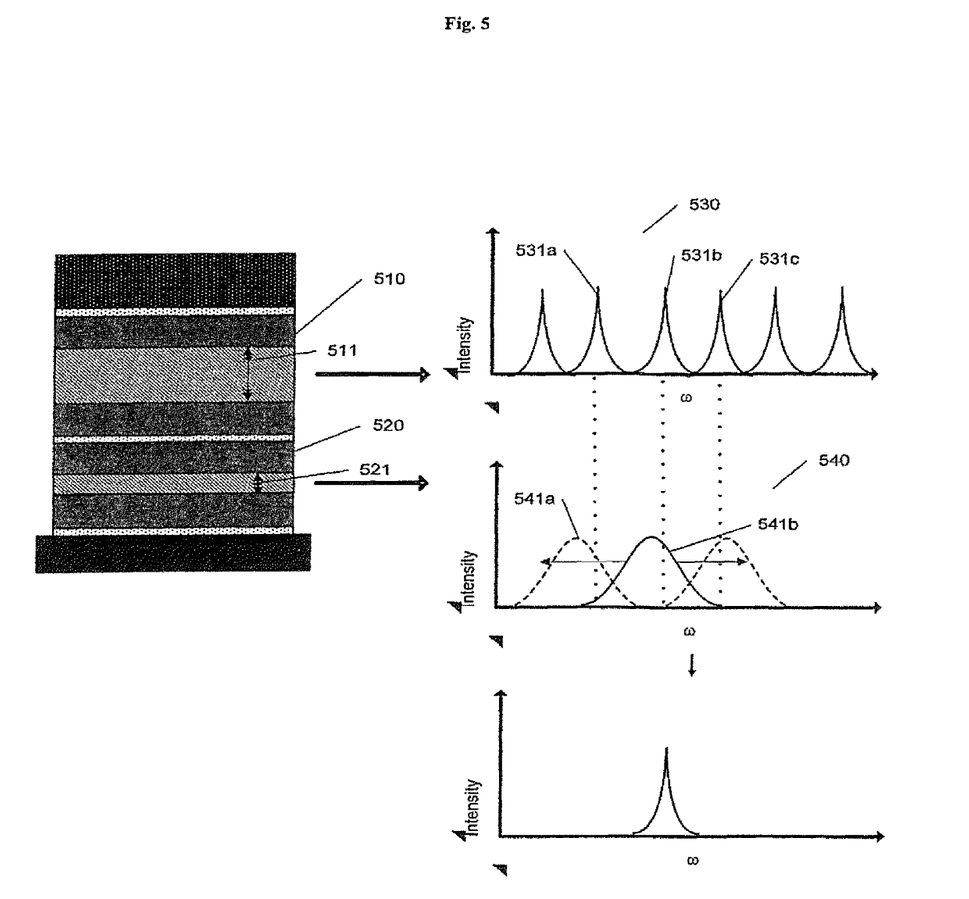
FIG. 5 is a schematic diagram of stacked tunable interferometers for hyperspectral imaging in accordance with the disclosed subject matter.
Figure 6:
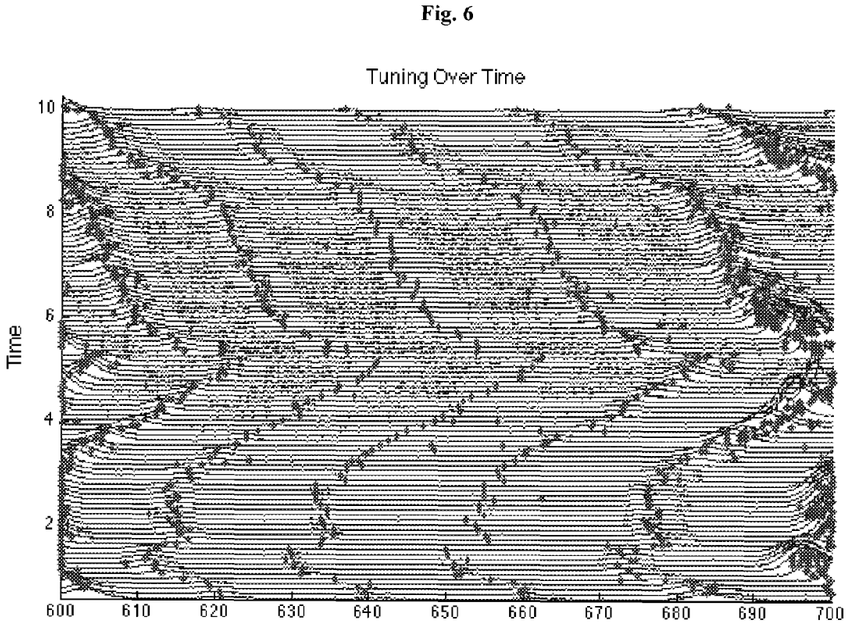
FIG. 6 illustrates an exemplary plot of the intensity of wavelengths transmitted through an exemplary interferometer in accordance with the disclosed subject matter over time.

In certain embodiments, and with reference to FIG. 5, a plurality of interferometers 510 and 520 can be stacked on top of each other. Each interferometer can be, e.g., interferometer 100 as described herein and in accordance with the disclosed subject matter. Each interferometer can be individually controlled by a voltage control circuit, such that the distance (511 and 521) between the mirrors of each interferometer, and thus the resonant frequency and FSR, can be individually controlled as shown on plots 530 and 540 of intensity vs. frequency. For example, for interferometer 510 with distance 511, transmission peaks 531a, 531b, and 531c (collectively 531) can have a narrow linewidth. For interferometer 520 with distance 521, transmission peak 541a or 541b can be broader than those of interferometer 510. In this manner, individual narrow-band spectral ranges can be determined. For example, a first interferometer 510 can be configured, via the voltage control circuit, to have a displacement between the mirrors corresponding to a small FSR, as illustrated in plot 530. A second interferometer 520 can be configured, in like manner, to have a broader FSR, as illustrated in plot 540. The first interferometer can create a "frequency comb" of allowable frequencies (531), of which the second interferometer can "select" where transmission frequencies overlap. Tuning the first interferometer 520 can shift the allowable frequencies (e.g., from 541a to 541b), adding a greater degree of control. Additionally or alternatively, the voltage control circuit for an interferometer can be configured to beat between multiple resonances to achieve a single transmission peak, as illustrated in FIG. 6 and described in more detail below.

Figure 3:
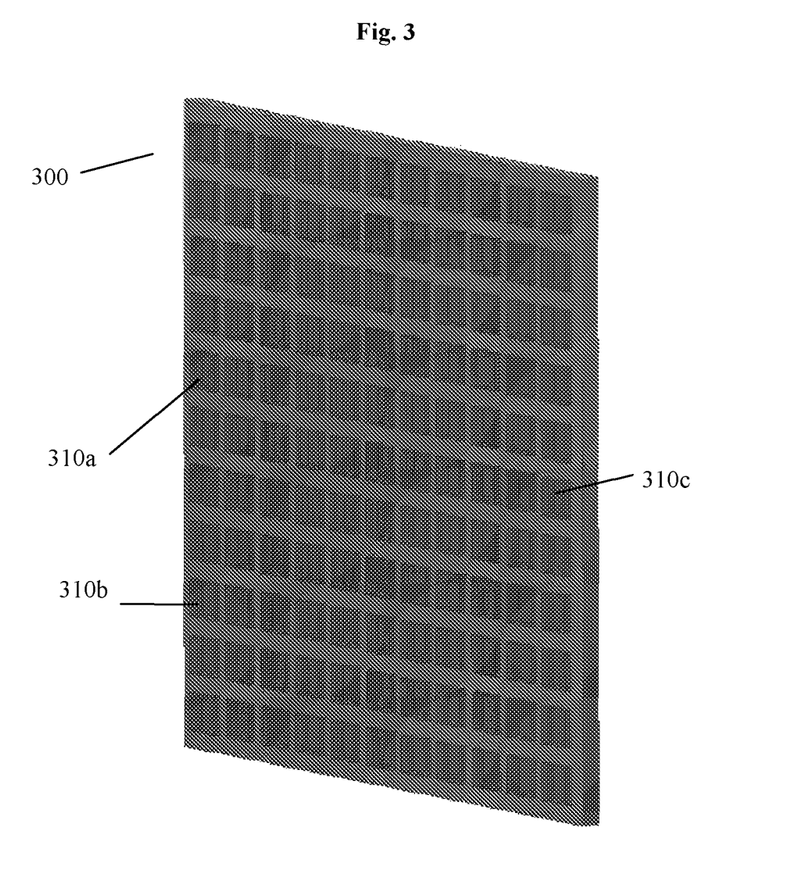
FIG. 3 is a schematic diagram of an array of tunable interferometers for hyperspectral imaging in accordance with an embodiment of the disclosed subject matter.

In certain embodiments, and with reference to FIG. 3, interferometers in accordance with the disclosed subject matter (e.g., interferometers 100) can be arranged in a grid structure 300. For example, individual interferometers 310a, 310b, and 310c (collectively, 310) can be arranged within a two dimensional array. In certain embodiments, the grid structure can correspond to an array of pixels of a conventional CCD, emCCD, or CMOS imaging array. That is, for example, interferometers 310 can be arranged within the grid structure 300 such that they can align with pixels of an imaging array. Such a grid structure 300 can include mounting features suitable to mechanically couple the grid structure to the imaging array. Alternatively, in certain embodiments, one or more interferometers can have macro-scale dimensions. That is, for example, the tunable interferometers can have dimensions suitable for use as an active optic to be inserted in a light path from an imaging system.

In another aspect of the disclosed subject matter, a method for hyperspectral imaging with an imaging device as disclosed herein can include, for each tunable interferometer, modulating a distance between the broadband mirrors with an applied voltage differential between the first and second electrodes. Modulation of the distance between the mirrors can alter the resonance of the tunable interferometer. At each pixel of the imaging device a signal from the corresponding tunable interferometer can be received, and an image based on the signal of each tunable interferometer. Modulating the distance between the broadband mirrors with an applied voltage differential can include physically altering the dimensions of the thin layer via one or more of uniformly deforming the thin layer of material via energy minimization between a spring-capacitor system arising from the applied voltage differential over the mirrors (where the material includes a soft material), uniformly altering the dimensions of the thin layer of material via piezostrictrive actuation (where the material includes a piezostrictrive material), or uniformly altering the dimensions of the thin layer of material via electrostrictive actuation (where the material includes an electrostrictive material).

Figure 4:
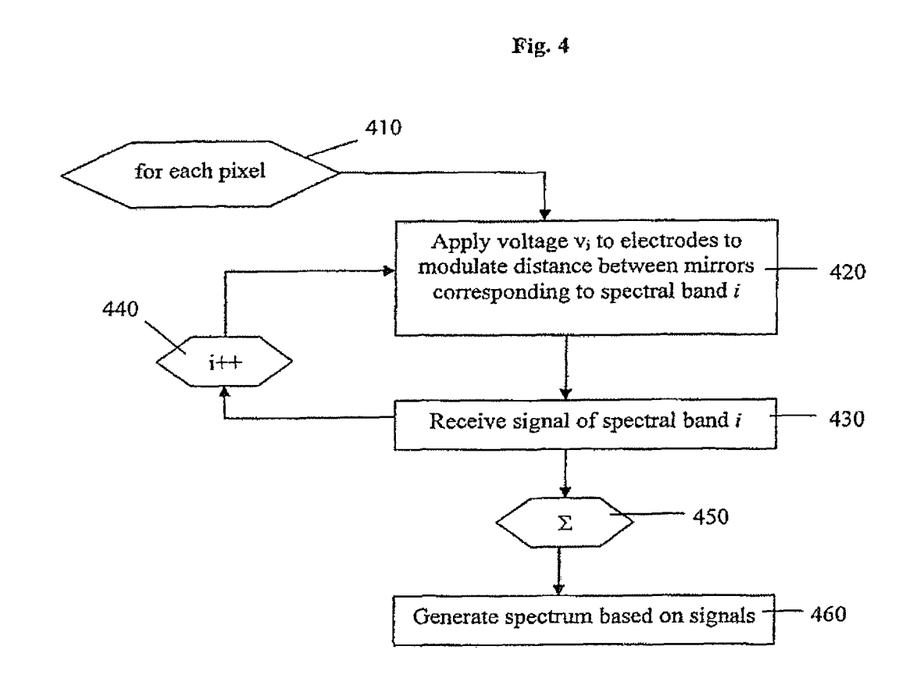
FIG. 4 is a flow diagram of an exemplary method for hyperspectral imaging in accordance with an embodiment of the disclosed subject matter.

For example in one embodiment, and with reference to FIG. 4, the method can include, for each pixel 410, applying 420 a first voltage to the electrodes to modulate the distance between the mirrors to a first distance corresponding to a first spectral band (i.e., with a FSR as described above). Each pixel 410 can receive a signal corresponding to the first spectral band passing through the interferometer. The voltage can then be varied 440 to a voltage corresponding to a second spectral band (e.g., by modulating the voltage the distance between the mirrors is modulated to correspond to the second spectral band), and each pixel 410 can receive the signal of the second spectral band. For each spectral band, an image can be generated 460 over an array of pixels. Additionally or alternatively, the signals received by the pixels can be summed 430 and stored in computer readable media, e.g., as an array of values.

In one embodiment, modulating the distance between the broadband mirrors can include beating between multiple resonances to thereby realize a single transmission peak. That is, for example, the voltage can be varied at a high frequency so such that transmission of a single spectral band can occur at high intensity relative to other spectral bands which can result from the distance between the mirrors at each voltage, but not necessarily both. For example, FIG. 6, is an exemplary plot of the intensity of wavelengths transmitted through an exemplary interferometer in accordance with the disclosed subject matter over time, with the exemplary interferometer's resonant frequency being altered over time. Intensity peaks are represented by dots, with the bottom axis corresponding to wavelength and the vertical axis corresponding to time. As illustrated in FIG. 6, the interferometer, with a spectral range of approximately 20 nm, can be tuned to shift the resonant within a range of approximately 40 nm.

Additionally or alternatively, in certain embodiments, modulating the distance between the broadband mirrors can include dynamically switching between high-spectral resolution imaging and low intensity transmission, and low-spectral resolution imaging and high intensity transmission. This can be accomplished, for example, via a number of stacked interferometers or the use of an interferometer geometry and materials suitable for large distance modulation. High-spectral resolution can be more desirable in connection with certain application (e.g., identifying chemical signatures) as compared to intensity transmission. Conversely, intensity of transmission can be more desirable in connection with certain applications (e.g., where spatial information is desired).

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the appended claims.

The invention claimed is:

1. A device for hyperspectral imaging, comprising:
a plurality of tunable interferometers including a thin layer of strictive material disposed between two or more broadband mirrors, the broadband mirrors reflective over a first wavelength range;
first and second electrodes, disposed on each side of the at least one tunable interferometer and each transparent over at least the first wavelength range;
a voltage control circuit electrically coupled to the first and second electrodes, whereby application of a voltage over the tunable interferometer modulates the distance between the broadband mirrors via strictive displacement of the thin layer of strictive material, and wherein the voltage control circuit is adapted to control the strictive displacement; and
an imaging device including an array of pixels,
wherein the plurality of tunable interferometers is arranged in a grid corresponding to the array of pixels, at least one tunable interferometer coupled to one of the pixels of the imaging device.

2. The device of claim 1, wherein the thin layer of strictive material includes a piezostrictive polymer.

3. The device of claim 2, wherein the thin layer of strictive material includes poly(vinylidenefluoride-co-trifluoroethylene).

4. The device of claim 1, wherein the thin layer of strictive material includes a piezostrictive ceramic patterned to include an air gap between at least a portion of the broadband mirrors.

5. The device of claim 1, wherein the thin layer of strictive material includes an electrostrictive material.

6. The device of claim 1, wherein at least one of the plurality of tunable interferometers further includes a plurality of mirrors, a thin layer of strictive material disposed between each mirror, thereby forming a set of coupled vertical resonators.

7. A device for hyperspectral imaging, comprising:
a plurality of tunable interferometers including a thin layer of soft material disposed between two or more broadband mirrors, the broadband mirrors reflective over a first wavelength range, each broadband mirror including at least one dielectric material;
one or more interstitial trenches into which the thin layer of soft material can expand, thereby allowing pressure to be distributed;
first and second electrodes, disposed on each side of the at least one tunable interferometer and each transparent over at least the first wavelength range;
a control circuit, including a voltage control circuit or a charge control circuit, electrically coupled to the first and second electrodes, whereby application of a voltage over the tunable interferometer modulates the distance between the broadband mirrors corresponding to a capacitance, and wherein the control circuit is adapted to control the capacitance;
an imaging device including an array of pixels,
wherein the plurality of tunable interferometers is arranged in a grid corresponding to the array of pixels, at least one tunable interferometer coupled to one of the pixels of the imaging device.

8. The device of claim 7, wherein each mirror includes a distributed Bragg reflector.

9. The device of claim 8, wherein the distributed Bragg reflector is formed from stacks of tantalum pentoxide and silicon dioxide.

10. The device of claim 7, wherein the thin layer of soft material includes a thin layer of polydimethylsiloxane.

11. The device of claim 10, wherein the thin layer of polydimethylsiloxane includes the one or more interstitial trenches.

12. The device of claim 7, wherein the at least one of the plurality of tunable interferometers further includes a plurality of mirrors, a thin layer of soft material disposed between each mirror, thereby forming a set of coupled vertical resonators.

13. A device for hyperspectral imaging, comprising:
at least one tunable interferometer including a thin layer of soft material disposed between two or more broadband mirrors, the broadband mirrors reflective over a first wavelength range, each broadband mirror including at least one dielectric material;

one or more interstitial trenches into which the thin layer of soft material can expand, thereby allowing pressure to be distributed;

first and second electrodes, disposed on each side of the at least one tunable interferometer and each transparent over at least the first wavelength range; and a control circuit, including a voltage control circuit or a charge control circuit, electrically coupled to the first and second electrodes, whereby application of a voltage over the tunable interferometer modulates the distance between the broadband mirrors corresponding to a capacitance, and wherein the control circuit is adapted to control the capacitance, wherein at least one of the two or more broadband mirrors includes the one or more interstitial trenches.

\* \* \* \* \*